United States Patent [19]

Merz et al.

[11] Patent Number: 5,301,892
[45] Date of Patent: Apr. 12, 1994

[54] APPARATUS AND METHOD FOR WINDING A STRIP OF WEB MATERIAL ONTO A SPOOL

[75] Inventors: Gary E. Merz, Rochester; William R. DeMunck, Hilton; John M. Giordano; Harold L. LaBrake, both of Rochester; Dale C. Marshall, Hamlin; David M. Reynolds, Rochester; Garry L. Wohlschlegel, Hemlock, all of N.Y.

[73] Assignee: Eastman Kodak Company, Rochester, N.Y.

[21] Appl. No.: 60,107

[22] Filed: May 10, 1993

[51] Int. Cl.⁵ .................. B65H 18/10; B65H 19/26
[52] U.S. Cl. ...................... 242/67.2; 242/56 R; 242/74
[58] Field of Search .............. 242/56 R, 74, 67.1 R, 242/67.2, 67.3 R, 195, 197, 71.1, 71, 76

[56] References Cited

U.S. PATENT DOCUMENTS

| | | | |
|---|---|---|---|
| 3,586,258 | 6/1971 | Horlezeder | 242/197 |
| 3,770,551 | 11/1973 | Ceroll | 242/56 R X |
| 3,910,516 | 10/1975 | Hoffacker et al. | 242/56 R |
| 4,181,271 | 1/1980 | Kluczynski et al. | 242/74 |
| 4,333,615 | 6/1982 | Kluczynski et al. | 242/71.1 |
| 4,519,553 | 5/1985 | Campbell et al. | 242/56 R |
| 4,635,869 | 1/1987 | Woodley | 242/74 X |
| 4,738,408 | 4/1988 | Odaka et al. | 242/197 |
| 4,747,554 | 5/1988 | Kubo | 242/56 R |
| 4,957,247 | 9/1990 | Nakamura et al. | 242/74 X |

Primary Examiner—John M. Jillions
Attorney, Agent, or Firm—Charles E. Snee, III

[57] ABSTRACT

A cut end (18) of a web (14) is held by a vacuum shuttle head (105, 106, 108, 136, 138) and a central vacuum finger (114-124) holds a central tongue (22) of the web during insertion into a preassembled cartridge (50, 52, 26). During winding the cartridge is rotated (174-184) to avoid scraping the web on the cartridge.

4 Claims, 7 Drawing Sheets

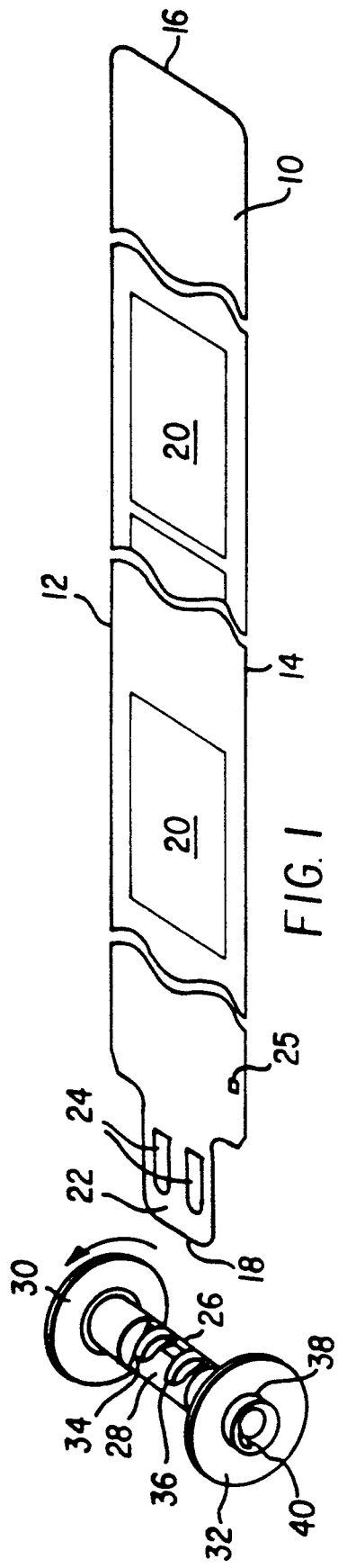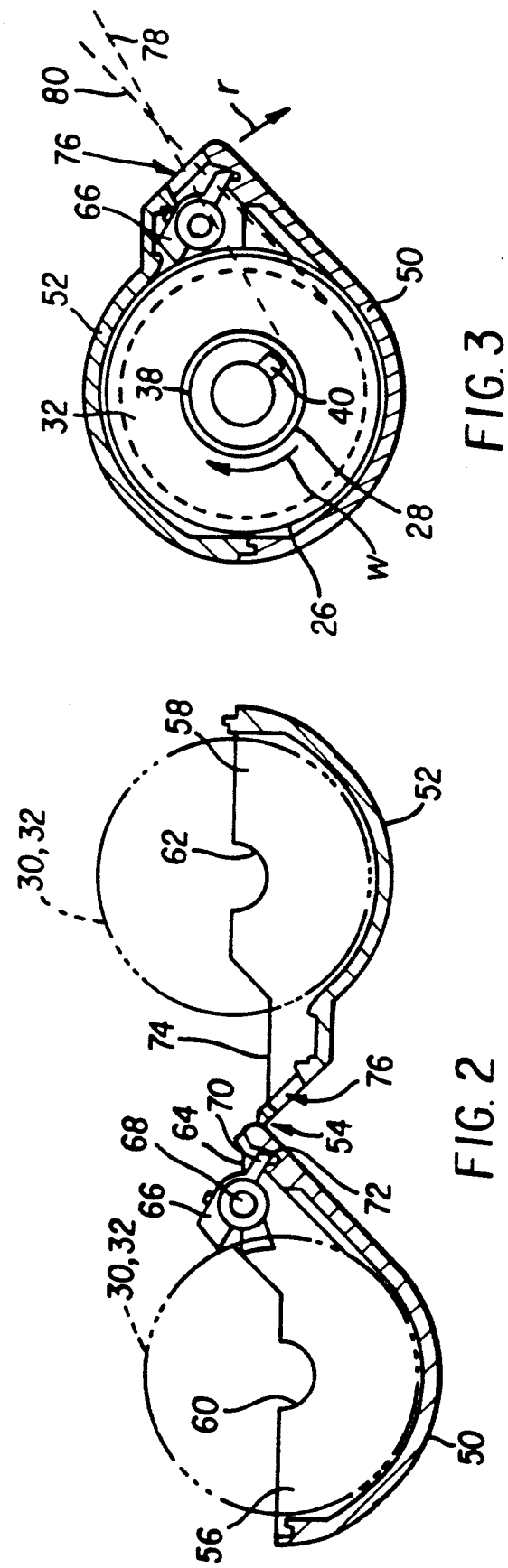

APPARATUS AND METHOD FOR WINDING A STRIP OF WEB MATERIAL ONTO A SPOOL

TECHNICAL FIELD

The invention concerns apparatus and methods for winding lengths of material onto spools. More particularly, the invention concerns such apparatus and methods for winding elongated webs, such as strips of photographic film, onto a spool enclosed within a light tight cartridge.

BACKGROUND ART

Conventional 35 mm film cartridges comprise a cylindrical metal shell with formed lips covered by strips of velvet material which serve as a lightlock to prevent light from entering the cartridge and exposing the enclosed spool of film, plus annular metal end caps staked onto each end of the metal shell. As shown in commonly assigned U.S. Pat. No. 2,940,232, the trailer end of the film is taped to the core of the spool. The spool of film is wound and then inserted axially into a preformed assembly of the metal shell, lightlock and one end cap, with the leader of the film strip extending through the lightlock, after which the second end cap is installed to complete the cartridge. An alternative approach to loading such a cartridge is shown in U.S. Pat. Nos. 3,586,258 and 3,910,516 which describe processes in which a guide tongue is inserted between the strips of velvet lightlock material of a fully assembled cartridge. An end of a film strip is inserted along the guide tongue and engaged with features on the spool of the cartridge, after which winding proceeds through the lightlock to the spool.

Various modifications to this familiar film cartridge have been suggested in the literature over the years as results of efforts to simplify and improve the structure of the cartridge and the apparatus and process for assembling and loading the cartridge. Recently, however, an improved cartridge has been developed which comprises a pair of mating cartridge halves, which may be injection molded and which totally enclose a spool for film. An elongated, axial slot is provided between the halves to permit film to be inserted into or withdrawn from the cartridge, the slot being provided with a pivotable lock or door to replace the conventional velvet lightlock. One example of a cartridge of this general type is shown in U.S. Pat. No. 4,333,615.

FIG. 1 illustrates a web 10 of a material such as photographic film, the web having longitudinal edges 12, 14 extending between a leader end 16 which will extend first from the completed film cartridge to engage a camera, and a trailer end 18 which will engage the spool for the film. A plurality of imaging areas 20 are spaced along web 10 between ends 16, 18 in the familiar manner. Leader end 18 is formed of a central tongue portion 22 having punched through its thickness a pair of elongated slots 24. A locator feature, such as an edge aperture 25, may be provided near trailer end 18 for a purpose to be discussed subsequently.

A spool 26 comprises a central core 28 having near its ends a pair of end flanges 30, 32 spaced slightly further apart than the width of web 14. Between end flanges 30, 32, core 28 is provided with an axial recess from which extend a pair of axially spaced, circumferentially curved hooks 34, 36 for engaging elongated slots 24. Each end of spool 26 is provided with an axially extending hub 38 and at least one of such hubs comprises a central bore having a radial notch 40 or similar feature for engaging a conventional quill shaft which rotates the spool to wind the web.

As those skilled in the art will understand from FIG. 1, web 14 may be attached to spool 26 simply by passing hooks 34, 36 through slots 24 and slipping the tip of tongue 22 beneath the hooks. Once this is done, spool 26 may be rotated in the direction of the arrow to wind web 14 onto the spool. If web 14 is made from a material which tends to curl back on itself longitudinally, as do many photographic film materials, web 14 may be oriented to curl toward spool 26, which tends to ease engagement of hooks 34, 36 with slots 24.

FIGS. 2 and 3 illustrate a cartridge into which a web of material such as photographic film may be easily and efficiently wound using the apparatus and method of the present invention. However, the apparatus and method of the invention also may be used with conventional film cartridges of the types mentioned previously. A first, essentially semi-cylindrical cartridge half 50 and a mating, essentially semi-cylindrical cartridge half 52 are provided which may be separate pieces or may be joined by an axially extended living hinge 54. Essentially semi-circular end walls 56, 58 are provided at the opposite ends of halves 50, 52, each end wall including a semi-circular aperture 60, 62 for receiving and rotatably supporting one of hubs 38. Half 50 comprises a longitudinally extended, radially outwardly projected lip 64. A longitudinally extended door or light valve 66 is supported rotatably on lip 64 by means of a pair of axially spaced trunnions 68, only one of which is visible in the illustrations. A longitudinally extended lip 70 of door 66 rests in the illustrated closed position of the door against a longitudinally extended stop surface 72 formed in lip 64. By means not illustrated, door 66 may be engaged from outside the assembled cartridge and rotated to an open position illustrated schematically in FIG. 5. Half 52 comprises a longitudinally extended, radially outwardly projected lip 74. A longitudinally extended slot or opening 76 is formed in lip 74 and is positioned opposite door 66 when halves 50, 52 are assembled about an empty spool 26 as shown in FIG. 3.

To wind web 14 into the assembled cartridge, door 66 first is rotated to its open position. Trailing end 18 is then inserted into the cartridge through slot 76 and slots 24 are engaged with hooks 34, 36. The problem of reliably achieving this engagement in a high speed production environment is solved in accordance with the present invention. In FIG. 3, the initial path 78 of web 14 at the beginning of winding onto spool 26 is shown to extend tangentially to core 28. However, as winding proceeds in the direction of arrow w, the increasing diameter of the wound material will cause the path of web 14 to move steadily toward the edge of slot 76, eventually resulting in scraping of the web if the position of the cartridge and the angle of the web remain unchanged. The problem of avoiding such scraping is solved in accordance with one aspect of the present invention by causing relative movement between initial path 78 and the cartridge in the direction of arrow r, so that the final path 80 of web 14 is essentially tangent to the as-wound diameter but is spaced safely from the edge of slot 76.

SUMMARY OF THE INVENTION

The apparatus of the invention is especially useful for spooling web of indeterminate length. The apparatus is of the general type including a supply of the web, a winding station for receiving a cartridge enclosing an empty spool having a core with means for engaging an end of the web, the cartridge comprising a longitudinal opening through which the end may be inserted, means for rotating the spool to draw the web through the longitudinal opening and wind the web onto the spool and means for guiding the web from the supply to the winding station. In accordance with the invention, such apparatus is improved by the inclusion of a vacuum means for gripping the web between the supply and the winding station, the vacuum means comprising a first surface through which vacuum is applied to grip the web behind the end of the web. A vacuum finger means is extendable from the vacuum means for gripping the end of the web, the vacuum finger means comprising a second surface through which vacuum is applied to grip the end when the vacuum finger means is extended. Means are provided for extending and withdrawing the vacuum finger means and for moving the vacuum means and the vacuum finger means between a first position where the web may be gripped by the vacuum means and a second position where the end of the web may be inserted, while gripped by the vacuum finger means, through the longitudinal opening into engagement with the means for engaging.

In one embodiment, the vacuum means comprises a pair of tines extending on either side of the vacuum finger means, the first surface extending along each of the tines; and means mounted on the tines for supporting the vacuum finger means for movement between the tines. The apparatus of the invention may also include means for rotating the cartridge during winding of the web onto the spool to prevent contact of the web with the cartridge as the web passes through the longitudinal opening.

The method of the invention is suited for spooling web of indeterminate length and includes the steps of providing a cartridge enclosing an empty spool having a core with means for engaging an end of the web, the cartridge comprising a longitudinal opening through which the end may be inserted; inserting the leading end through the longitudinal opening into engagement with the spool; and rotating the spool to draw the web through the longitudinal opening and wind the web onto the spool. In accordance with the method of the invention, the cartridge is rotated during winding of the web onto the spool to prevent contact of the web with the cartridge as the web passes through the longitudinal opening.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 1 illustrates a perspective view of a strip of photographic film and a spool of the types which are to be engaged and wound together in accordance with the invention.

FIG. 2 illustrates an elevation, sectional view of a cartridge for receiving the film and spool of FIG. 1, with the cartridge halves in their preassembled condition.

FIG. 3 illustrates an elevation, sectional view of the cartridge of FIG. 2, with the cartridge halves in their assembled condition.

DESCRIPTION OF THE PREFERRED EMBODIMENTS

Figure 4:
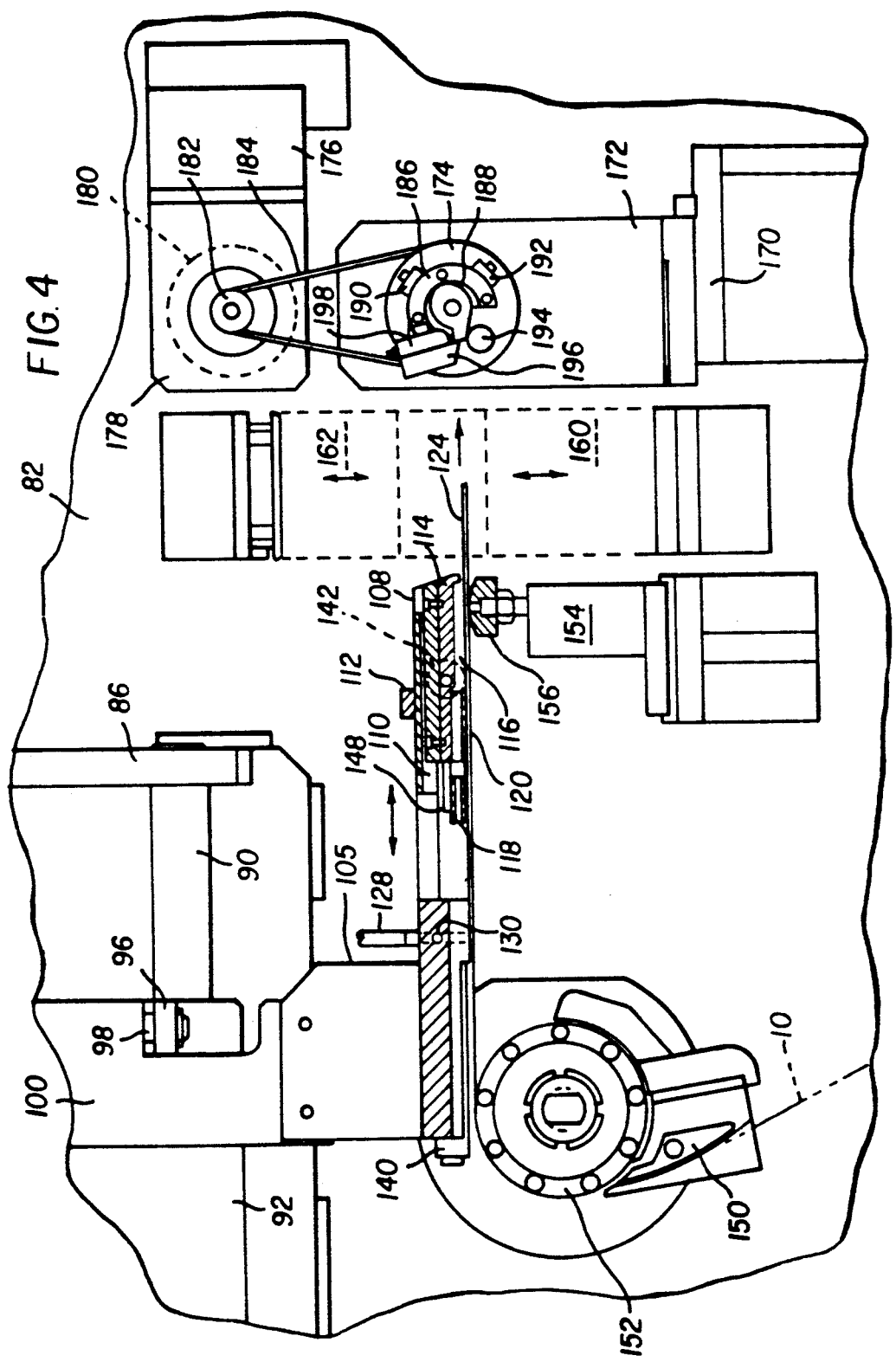
FIG. 4 illustrates an elevation, partially sectional view of the apparatus of the invention.

The following is a detailed description of the preferred embodiments of the invention, reference being made to the drawings in which the same reference numerals identify the same elements of structure in each of the several Figures.

As illustrated in FIGS. 4 to 9, the apparatus of the invention includes a preferably vertical face plate 82 which is supported by a suitable frame not illustrated. A pair of bracket plates 84, 86 extend outwardly from face plate 82 and support between them a pair of parallel, horizontal slide bars 88, 90 on which a horizontally moveable carriage 92 is supported by suitable bearings not illustrated. Behind carriage 92, face plate 82 supports a suitable drive to move the carriage back and forth on slide bars 88, 90, such as a motor driven crank arm with a cam follower engaging a cam slot on the carriage, not illustrated. A pair of bracket plates 94, 96 extend outwardly from carriage 92 and support between them a vertical slide bar 98 on which a vertically moveable carriage 100 is supported by suitable bearings not illustrated. Bracket plate 94 supports a pneumatic cylinder 102 whose rod end 104 engages carriage 100 to move the carriage down slide bar 98 against the resistance of a coil spring 104a connected between bracket plate 94 and carriage 100. Thus, carriage 100 can be moved both vertically and horizontally by suitable actuation of cylinder 102 and the drive for carriage 92.

Figure 7:
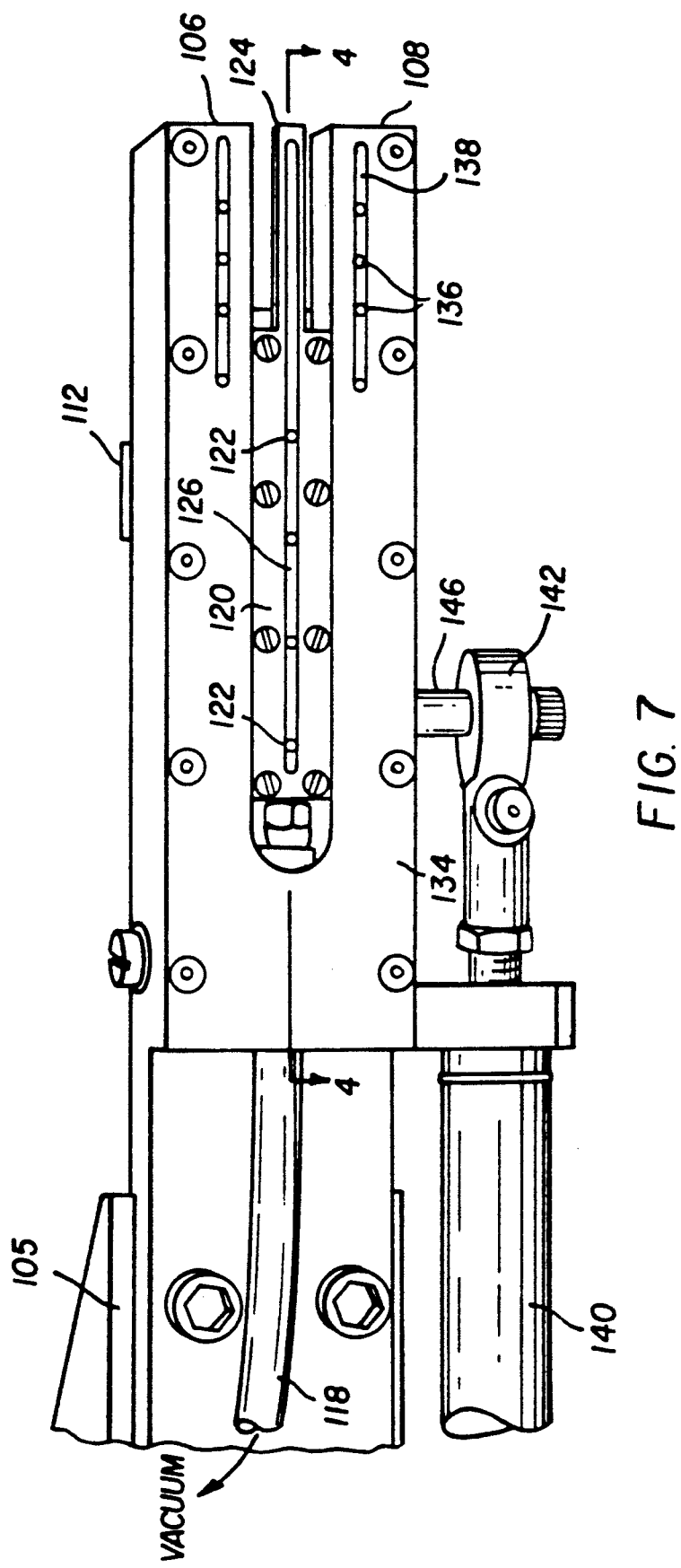
FIG. 7 illustrates a plan view of the underside of the vacuum head of the shuttle station, with the central vacuum finger fully retracted.
Figure 8:
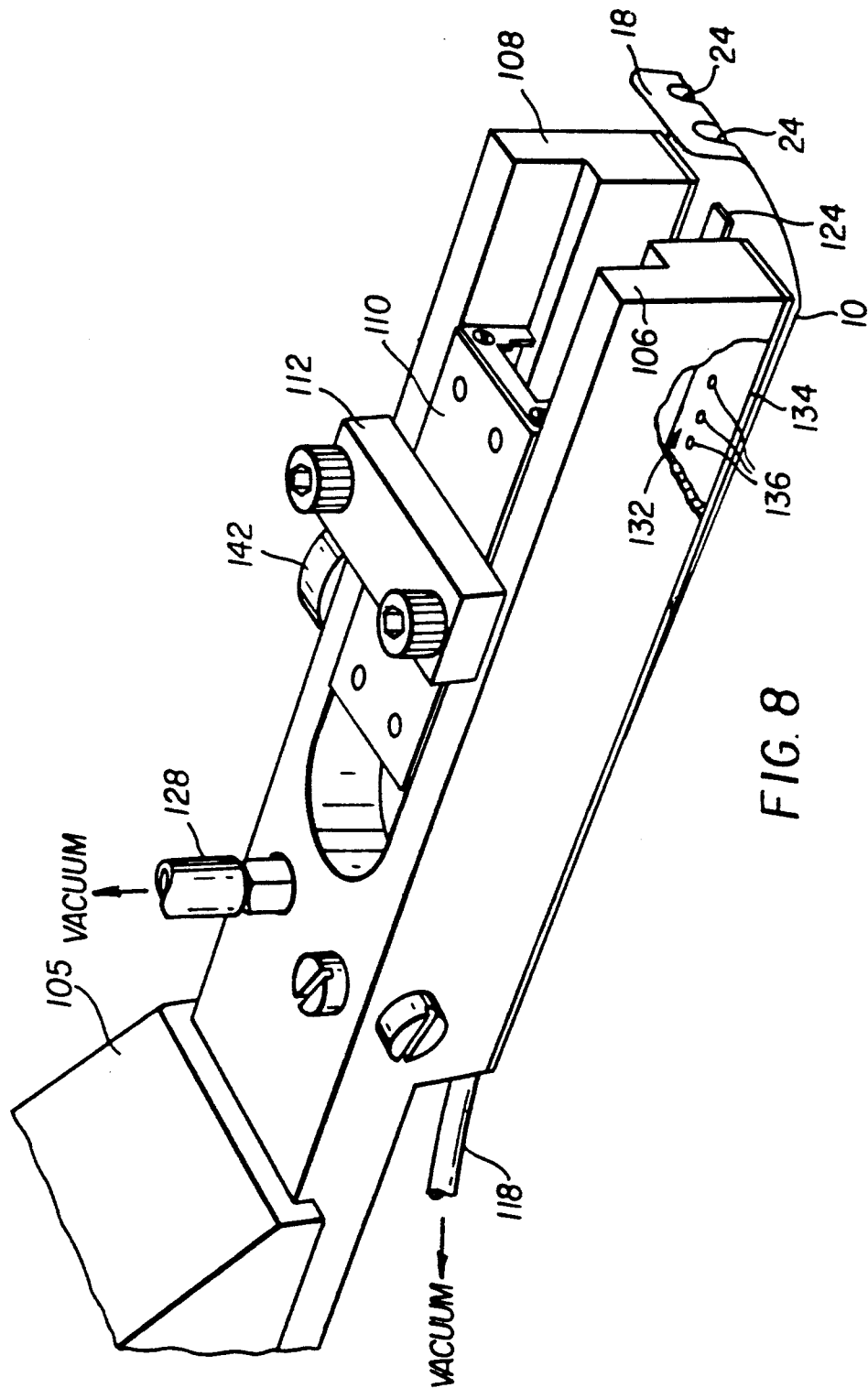
FIG. 8 illustrates an enlarged, perspective and partially sectional view of the vacuum head, with the central vacuum finger fully retracted and the trailing end curled upwardly.
Figure 9:
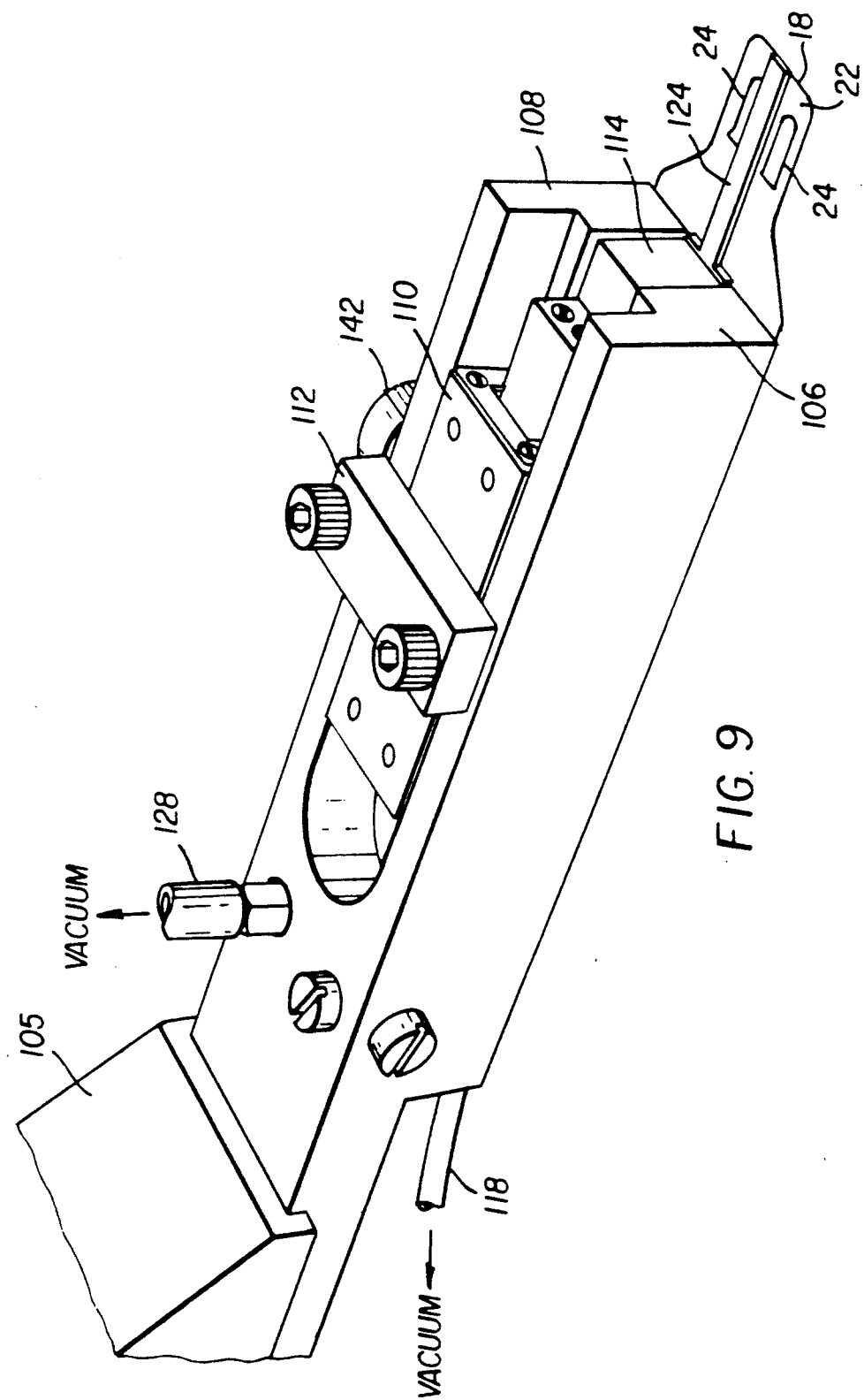
FIG. 9 illustrates an enlarged, perspective view of the vacuum head, with the central vacuum finger fully extended and the trailing end straightened for engagement with the spool.

Depending from carriage 100 is the horizontally extended vacuum shuttle head 105 according to the invention. As seen in FIGS. 7 to 9, vacuum shuttle head 105 comprises a pair of horizontally spaced tines 106, 108 which support between them a ball slide 110 by means of a keeper plate 112 mounted to ball slide 110 and to the upper surfaces of tines 106, 108. The bottom half of ball slide 110 supports an elongated vacuum manifold block 114 which extends between tines 106, 108. Block 114 comprises an interior vacuum plenum 116, shown partially in FIG. 4, which communicates at one end with a vacuum hose or conduit 118. A bottom plate 120 closes plenum 116 and is provided with a plurality of centrally located, axially spaced vacuum ports or apertures 122 for engaging web 10 just behind central tongue 22. At its end opposite to conduit 118, bottom plate 120 comprises a centrally located, axially extending vacuum finger 124 for engaging web 10 between elongated slots 24. A central groove 126 is machined into the smooth outer surface of bottom plate 120 and extends between apertures 122 and along substantially the length of the bottom plate, including finger 124. Thus, when vacuum is applied to conduit 118 and web 10 is engaged with apertures 122 and groove 126, web 10 is held firmly to bottom plate 120.

A further vacuum hose or conduit 128 is connected to vacuum shuttle head 105 and communicates in the familiar manner through interior bores 130 within the head to a pair of elongated interior vacuum plenums 132 located one near each of the free ends of tines 106, 108, as best seen in FIG. 8. A further bottom plate 134, fork-shaped like vacuum shuttle head 105, closes plenums 132 and has an outer surface coplanar with the surface of bottom plate 120. Each tine of bottom plate 134 comprises near its outer end a plurality of centrally located, axially spaced vacuum ports or apertures 136 communicating with the associated plenum 132 for engaging web 10 outboard of apertures 122 and behind central tongue 22. A pair of grooves 138 are machined into the smooth outer surface of each tine of bottom plate 134 and extend between apertures 136. Thus, when vacuum is applied to conduit 128 and web 10 is engaged with apertures 136 and grooves 138, web 10 is held firmly to bottom plate 134.

FIG. 8 illustrates how web 10 can be held on the underside of vacuum shuttle head 105 when vacuum finger 124 is retracted between tines 106, 108. As illustrated, a web 10 of photographic film tends to curl longitudinally upward where it extends past tines 106, 108, a condition which could make attachment to a spool rather difficult. To solve this problem, as shown in FIGS. 7 to 9, vacuum shuttle head 105 is provided on one side with a pneumatic cylinder 140 whose rod end 142 is pivotably connected to a connector arm 146. A longitudinal slot 148 is provided in tine 108, as seen in FIG. 4, through which connector arm 146 extends into engagement with the lower half of ball slide 110. Thus, when the rod of cylinder 140 is extended to the position of FIGS. 4, 5 and 9, vacuum finger 124 presses the trailing end of web 10 downward, thereby straightening central tongue 22 to facilitate engagement with hooks 34, 36 on spool 26. Vacuum is then applied to conduit 128 to hold the central portion of the trailing end firmly.

The overall apparatus of the invention is illustrated in FIG. 4. Web 10 is passed over a conventional air bar 150 and into engagement with a conventional ported vacuum drum 152 mounted to face plate 82 for intermittently delivering web 10 to the apparatus. Those skilled in the art will appreciate that web 10 may have been provided upstream of vacuum drum 152 with cutout portions defining the side edges of leader end 16 and trailer end 18 for successive strips of web material as shown in FIG. 1, but leaving the strips joined transversely for cutting just prior to spooling. From vacuum drum 152, web 10 passes horizontally beneath vacuum shuttle head 105 and over a detector 154, such as an optical sensor mounted within a smooth surfaced bull nose guide 156. Detector 154 responds to the passage of locator feature 25 shown in FIG. 1 and sends a signal to a conventional controller for the apparatus, not illustrated, which stops vacuum drum 152 when web 10 is in position to be cut between ends 16, 18. Cutting of the web may be accomplished using any conventional die set 160 and punch set 162 mounted on either side of the path of web 10. Die and punch set 160, 162 may simply cut the web between previously formed leader and trailer ends or may form leader and trailer ends 16, 18, central tongue 22 and apertures 24 simultaneously with cutting the web transversely between the ends, without departing from the scope of our invention. Die set 160, 162 must be capable of opening wide enough to permit the passage of vacuum shuttle head 105. One such die set is shown in commonly assigned U.S. Pat. No. 5,125,630.

Figure 5:
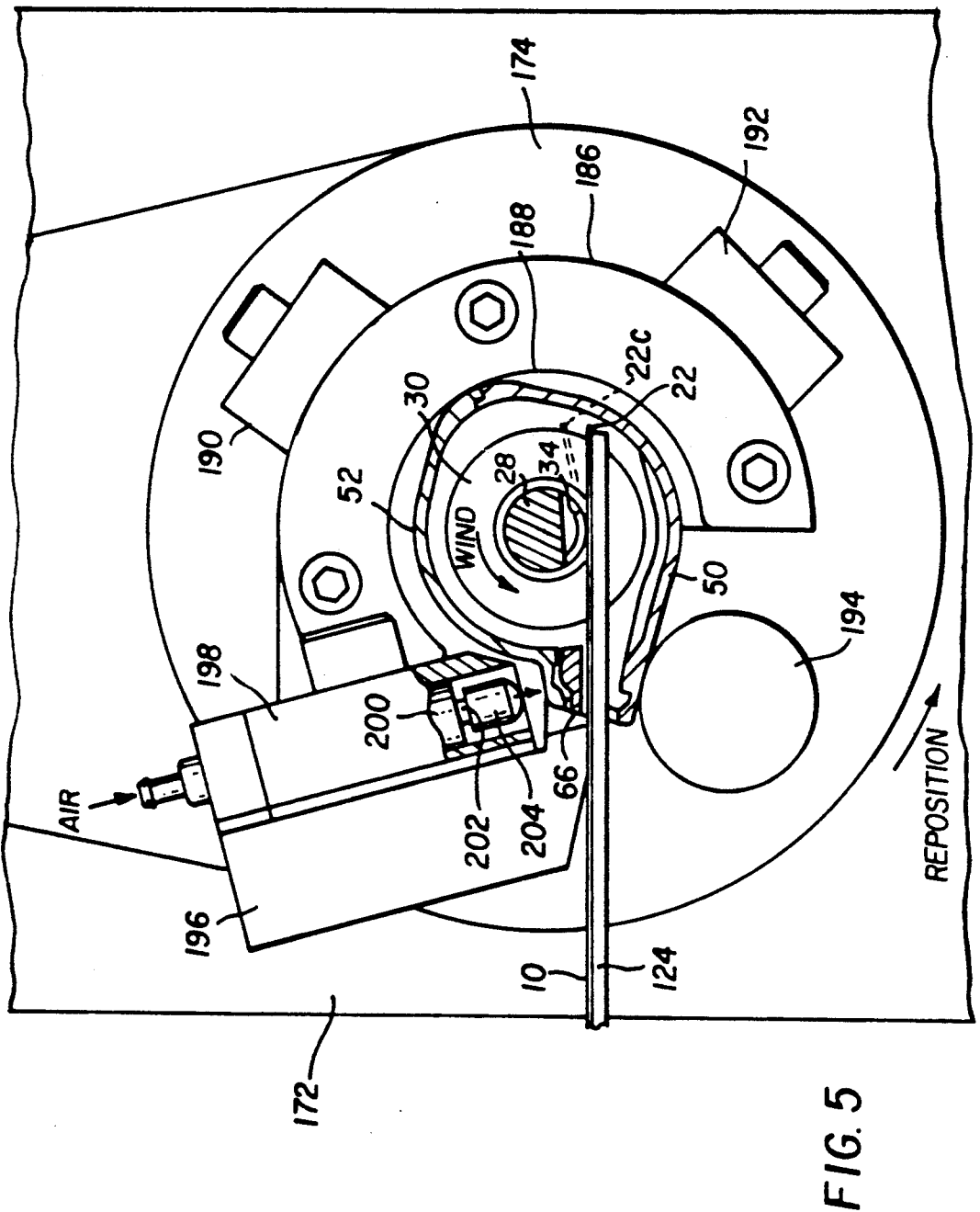
FIG. 5 illustrates an enlarged, fragmentary elevation view of the winding station of the apparatus of the invention, with the central vacuum finger in its fully extended, inserted position.
Figure 6:
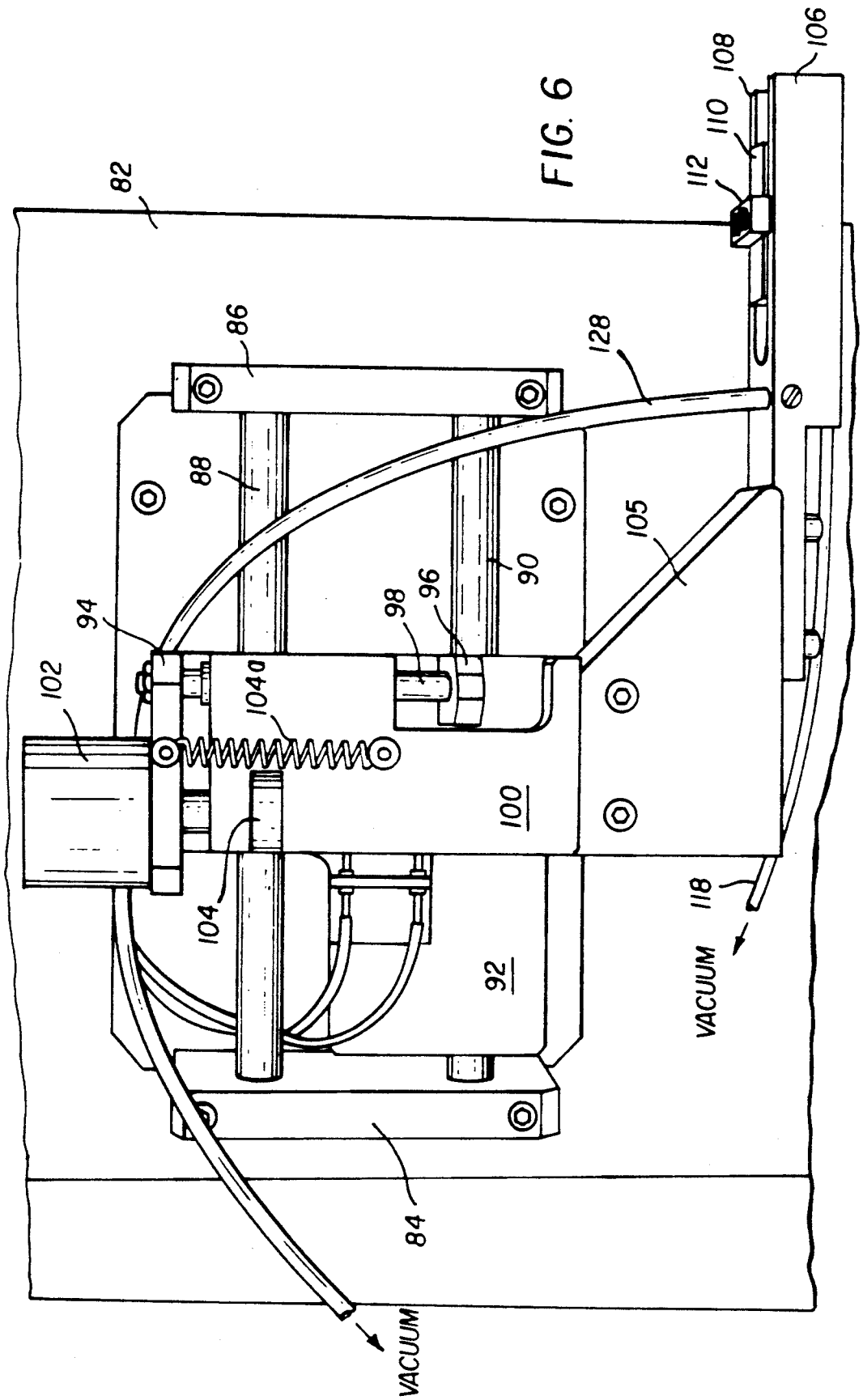
FIG. 6 illustrates an enlarged, perspective view of the film shuttle station of the apparatus of the invention in its retracted position.

Once a trailer end has been formed on web 10, vacuum shuttle head 105 moves the trailer end toward the spooling station illustrated in FIG. 4 and 5. A bracket 170 is mounted to face plate 82 and supports a vertically extending mounting plate 172. Near its upper end, mounting plate 172 is provided with a bore through which a conventional winding quill, not illustrated, is extended to engage within one of hubs 38 of a preassembled cartridge of the type shown in FIG. 3. A conventional winding motor, also not illustrated, is mounted on the back side of face plate 82 to rotate the quill shaft and wind a strip of web 10 into the cartridge. Rotatably mounted on plate 172 concentrically with the quill shaft is a circular dial or timing pulley 174. Above pulley 174, as illustrated, a bracket 176 supports a horizontally extending mounting plate 178. A stepper motor 180, shown in phantom, is supported by mounting plate 178 and has mounted on its output shaft a timing pulley 182 engaged with a timing belt 184 also engaged with timing pulley 174. Bolted to timing pulley 174, preferably concentrically with the quill shaft, is a C-shaped nest element 186 having a central, axially extending pocket 188 for receiving a previously assembled cartridge, as illustrated. A pair of rotational stops 190, 192 may be provided to accurately locate nest element 186 against other stops not illustrated. Opposite the open side of pocket 188, a stop pin 194 is mounted to timing pulley 174 in position to engage the outside surface of longitudinally extending lip 64 of the cartridge. The previously assembled cartridge may be inserted into pocket 188 manually or in any convenient manner, with door 66 already in the open position illustrated in FIG. 5. To hold the cartridge firmly in place, a mounting bracket 196 is attached to pulley 174 and supports a pneumatic cylinder 198 having a piston 200 with a rod 202 connected to a retention button 204. Once a cartridge has been placed in nest element 186, piston 200 is moved downwardly from the position illustrated in FIG. 5 to press button 204 against the outer surface of longitudinally extending lip 74 of the cartridge, thereby causing the cartridge to rotate into contact with stop pin 194 where it is held while winding proceeds.

The overall operation of the apparatus will be readily understood by those skilled in the art from the foregoing description. More specifically, however, assume that for a previous cartridge a strip of film has been wound almost completely onto the spool. Web 10 will be extending to the left of the cartridge as viewed in FIGS. 4 and 5. Vacuum finger 124 will have been retracted between tines 106, 108 when the previous winding commenced and vacuum shuttle head 105 will have been withdrawn to the left on slide bars 88, 90 and raised above the path of web 10 on slide bar 98, to avoid scraping web 10 during winding. Eventually, detector 154 responds to the passage of feature 25 on web 10 and signals the controller to stop vacuum drum 152 and bring the web to a stop. Vacuum shuttle head 105 is then lowered by cylinder 102 and vacuum is applied to conduit 128 to suck the web into contact with bottom plate 134. Die set 160, 162 is then actuated to cut the web between the leader and trailer ends, after which the die set withdraws to permit passage of the vacuum shuttle head. Leader end 16 of the previous strip of web 10 is then wound into the cartridge and the cartridge is removed by any convenient means, not illustrated. Door 66 is closed at another location.

A new, empty cartridge is then positioned in nest element 186; retention button 204 is pressed into contact with the lip of the cartridge; and the winding quills, not illustrated, are engaged with the ends of the spool. The quill shaft rotates the spool until hooks 34, 36 are positioned as illustrated in FIG. 5. Cylinder 140 is actuated to extend finger 124 and straighten central tongue 22 of trailer end 18, after which vacuum is applied to conduit 118 to suck central tongue 22 into contact with bottom plate 120. Vacuum shuttle head 105 is then advanced along slide bars 88, 90 until vacuum finger 124 reaches the position illustrated in FIG. 5. Pulses from an encoder on the shaft of the motor, which moves carriage 92 back and forth in the manner previously described, may be counted to determine precisely when the vacuum finger reaches the illustrated position. Vacuum is then released at conduit 118 and finger 124 is retracted, permitting central tongue 22 to curl upwardly to position 22c shown in phantom in FIG. 5. The stepper motor 180 is then rotated slightly to cause the cartridge shell to rotate about the spool a few degrees counterclockwise, as illustrated. This causes the lower cartridge half 50 to deflect central tongue 22 up to position 22c, thus ensuring that a web with little tendency to curl will still engage properly with hooks 34, 36. Vacuum shuttle head 105 is then pulled gently to the left to firmly engage the hooks with the slots. Vacuum drum 152 is reversed momentarily to tension the web while vacuum is released at conduit 128 to release the web. Then the quill shaft is rotated counterclockwise to commence winding; and vacuum shuttle head 105 is raised and withdrawn to the left. As winding proceeds, stepper motor 180 is rotated to cause nest element 186 to rotate gradually clockwise to prevent web 10 from scraping over the edge of slot 76 as the size of the wound roll increases. For 35 mm film, a rotation of nest element 186 on the order of 10 degrees is sufficient to prevent such scraping. When feature 25 again is detected, the process repeats for the next cartridge.

In accordance with the invention, a web such as photographic film can be attached to a spool within a preassembled cartridge by using a reciprocating vacuum finger to guide the web into the cartridge and support the trailing end of the web during attachment to the spool. To prevent scraping of the film during winding into the cartridge, the cartridge is rotated relative to the spool as the size of the wound roll increases.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. In an apparatus for spooling web of indeterminate length, said apparatus being of the type including a supply of said web, a winding station for receiving a cartridge enclosing an empty spool having a core with means for engaging an end of said web, said cartridge comprising a longitudinal opening through which said end may be inserted, means for rotating said spool to draw said web through said longitudinal opening and wind said web onto said spool and means for guiding said web from said supply to said winding station, the improvement comprising:

vacuum means for gripping said web between said supply and said winding station, said vacuum means comprising a first surface through which vacuum is applied to grip said web behind said end;

vacuum finger means extendable from said vacuum means for gripping said end, said vacuum finger means comprising a second surface through which vacuum is applied to grip said end when said vacuum finger means is extended;

means for extending and withdrawing said vacuum finger means; and means for moving said vacuum means and said vacuum finger means between a first position where said web may be gripped by said vacuum means and a second position where said end may be inserted, while gripped by said vacuum finger means, through said longitudinal opening into engagement with said means for engaging.

2. Apparatus according to claim 1, further comprising means for rotating said cartridge during winding of said web onto said spool to prevent contact of said web with said cartridge as said web passes through said longitudinal opening.

3. Apparatus according to claim 1, wherein said vacuum means comprises a pair of tines extending on either side of said vacuum finger means, said first surface extending along each of said tines; further comprising means mounted on said tines for supporting said vacuum finger means for movement between said tines.

4. In a process for spooling web of indeterminate length including the steps of providing a cartridge enclosing an empty spool having a core with means for engaging a leading end of said web, said cartridge comprising a longitudinal opening through which said leading end may be inserted; inserting said leading end through said longitudinal opening into engagement with said spool; and rotating said spool to draw said web through said longitudinal opening and wind said web onto said spool, the improvement comprising the step of:

rotating said cartridge during winding of said web onto said spool to prevent contact of said web with said cartridge as said web passes through said longitudinal opening.

* * * * *